UNITED STATES PATENT OFFICE.

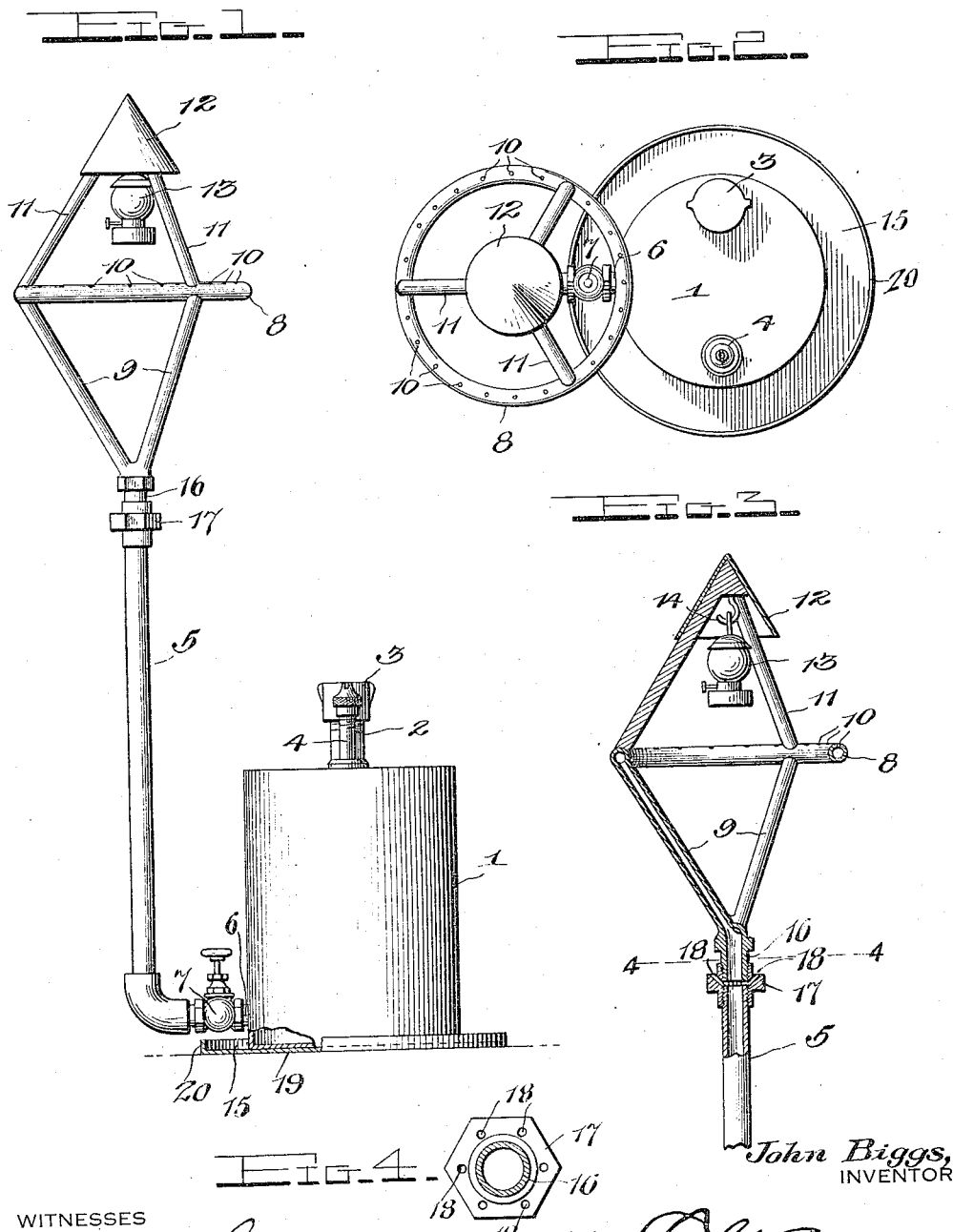

JOHN BIGGS, OF KIMBALL, NEBRASKA.

INSECT-EXTERMINATOR.

1,168,149. Specification of Letters Patent. Patented Jan. 11, 1916.

Application filed April 29, 1914. Serial No. 835,293.

*To all whom it may concern:*

Be it known that I, JOHN BIGGS, a citizen of the United States, residing at Kimball, in the county of Kimball and State of Nebraska, have invented a new and useful Insect-Exterminator, of which the following is a specification.

The invention relates to improvements in insect exterminators.

The object of the present invention is to improve the construction of insect exterminators and to provide a simple, efficient, and comparatively inexpensive device designed for use in orchards, vineyards, and various other places for destroying white flies and various other insects injurious to fruit trees, grape vines, and various other trees and plants.

A further object of the invention is to provide a device of this character equipped with a light for attracting such insects and with means for positively spraying with poisonous vapor the insects which are attracted by the light.

With these and other objects in view the invention consists in the construction and novel combination of parts hereinafter fully described, illustrated in the accompanying drawing, and pointed out in the claims hereto appended, it being understood that various changes in the form, size, proportions and minor details of construction, within the scope of the claims, may be resorted to without departing from the spirit or sacrificing any of the advantages of the invention.

In the drawings: Figure 1 is a side elevation of an insect exterminator constructed in accordance with this invention. Fig. 2 is a plan view of the same. Fig. 3 is a vertical sectional view through the upper portion of the device. Fig. 4 is a detail sectional view on the line 4—4 of Fig. 3, showing the spray openings of the coupling.

Like numerals of reference designate corresponding parts in all the figures of the drawing.

In the accompanying drawing, in which is illustrated the preferred embodiment of the invention, 1 designates a tank or reservoir, of cylindrical or any other preferred shape, designed to contain a poisonous liquid, and provided at the top with a filling orifice and having an upwardly projecting flange or tube 2 thereat, threaded for the reception of a removable closure cap 3. The tank is also provided at its upper portion with a suitable valve 4, adapted to be connected with an ordinary air pump or compressor for introducing air under pressure into the tank or reservoir for forcing the liquid contents thereof outward through a vertical discharge pipe 5, constituting a post and connected with the bottom portion of the tank or reservoir by a horizontal arm or branch 6. The horizontal arm or branch 6 is equipped with a suitable controlling valve 7 and the vertical discharge pipe 5 supports a horizontally disposed spray ring 8 connected at spaced points with the pipe 5 by a plurality of upwardly diverging tubes 9, forming arms and supporting the spray tube or ring 8. The tubes 9 diverge from a short stem 16, which is secured to the upper end of the discharge pipe 5 by a coupling 17, provided with a plurality of discharge perforations 18 drilled through the upper portion of the coupling substantially at an angle of forty-five degrees. The coupling, with its discharge perforations, coöperates with the spray tube in exterminating the insects by discharging the poisonous liquid upwardly and outwardly at points below the said spray tube.

The spray tube or ring 8, which is provided in its upper face with suitable perforations 10 for the discharge of the poisonous vapor, has mounted upon it a tripod 11, constituting a support having a superimposed cap 12 and a lamp 13. The tripod consists of rods or legs secured at their lower ends to the spray tube or ring and connected at their upper ends. The conical cap 12, which is constructed of sheet metal or other material, covers the upper portion of the tripod and forms a deflector or shield for throwing the light downwardly. The lamp 13 is suspended from the hook 14, located within the conical cap, and suitably secured to the tripod or support 11.

The tank and the rest of the apparatus may be made in various sizes to suit the requirements, and when the apparatus is in operation, the poisonous vapor is discharged upwardly from the spray tube or ring, and insects attracted by the light will be subjected to the action of the said vapor and destroyed. Any liquid accumulating on the apparatus and dripping from the discharge pipe or tube will be caught within a projecting trough 15, formed by a detachable pan or receptacle consisting of a horizontal bottom 19 and a vertical wall 20 extending upwardly from the bottom 19 at the periphery thereof and arranged in spaced relation with and surrounding the tank or reservoir. The projecting portion or trough of the receptacle is adapted to catch and save considerable of the liquid discharged from the device. The valve 7 enables the discharge of the spray to be controlled to suit the character of the material employed and the kind of insects to be destroyed.

The jet openings of the coupling 17 may be employed for sprinkling or spraying when it is not desirable to use the spray ring, as the coupling detachably connects the spray ring with the vertical discharge tube. When the spray ring is removed, the opening in the upper end of the vertical discharge tube will, of course, be plugged. When a profusion of spray is desired, the coupling and the spray ring are employed, but when it is desired to use only the spray ring, a plain coupling may be substituted for the coupling having the jet openings.

The tank, which is adapted to be arranged upon the ground, constitutes a base for supporting the insect exterminator in an upright position. The insect exterminator, which is portable, is adapted to be readily transferred from one place to another, and the spray ring, which is of considerably greater diameter than the lamp, is adapted to throw a curtain of spray upwardly around the same.

What is claimed is:

1. A portable insect exterminator including a tank constituting a base and adapted to be arranged upon the ground, a fluid discharge pipe or post connected at its lower end with the tank, a perforated spray ring located above and supported by and communicating with the discharge pipe or post, a lamp support mounted upon and extending upwardly from the spray ring, and a lamp carried by the said support and located above the spray ring, the latter being of considerably greater diameter than the lamp and adapted to throw a curtain of spray upwardly around the same.

2. A portable insect exterminator including a tank constituting a base and adapted to be arranged upon the ground, a fluid discharge pipe or post connected at its lower end with the tank, arms mounted upon and diverging upwardly from the discharge pipe or post, a perforated spray ring supported by the arms and communicating with the said discharge pipe or post, a lamp support composed of inclined legs mounted on and extending upwardly and inwardly from the spray ring, a cap fitted over the upper ends of the legs, and means carried by the legs for supporting a lamp above the spray ring and beneath the cap, the ring being of considerably greater diameter than the lamp and adapted to throw a curtain of spray upwardly around the same.

3. An insect exterminator, comprising a fluid discharge pipe, a perforated spray ring connected to the upper terminal of the discharge pipe and in communication therewith, a plurality of legs mounted on the ring and extending upwardly and converging at their outer ends, a lamp suspended from the upper terminals of the legs, and a cap fitted over the upper terminals of the legs and extending downwardly sufficiently for throwing the light in a downward direction, whereby the insects in seeking the light will pass between the cap and ring and through the spray.

In testimony, that I claim the foregoing as my own, I have hereto affixed my signature in the presence of two witnesses.

JOHN BIGGS.

Witnesses:
 WILL J. DAVIES,
 D. B. McKINNEY.